(12) United States Patent
Chen et al.

(10) Patent No.: US 9,470,949 B2
(45) Date of Patent: Oct. 18, 2016

(54) ELECTROPHORETIC DISPLAY DEVICE AND METHOD FOR MANUFACTURING THE SAME

(71) Applicants: CHENGDU BOE OPTOELECTRONICS TECHNOLOGY CO., LTD., Chengdu, Sichuan (CN); BOE TECHNOLOGY GROUP CO., LTD., Beijing (CN)

(72) Inventors: Zhenxia Chen, Beijing (CN); Xiao Li, Beijing (CN); Ni Jiang, Beijing (CN)

(73) Assignees: CHENGDU BOE OPTOELECTRONICS TECHNOLOGY CO., LTD., Chengdu, Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 142 days.

(21) Appl. No.: 14/344,834

(22) PCT Filed: May 2, 2013

(86) PCT No.: PCT/CN2013/075085
§ 371 (c)(1),
(2) Date: Mar. 13, 2014

(87) PCT Pub. No.: WO2014/131243
PCT Pub. Date: Sep. 4, 2014

(65) Prior Publication Data
US 2015/0293423 A1    Oct. 15, 2015

(30) Foreign Application Priority Data
Feb. 28, 2013    (CN) .......................... 2013 1 0064383

(51) Int. Cl.
*G02F 1/167* (2006.01)
*G02F 1/01* (2006.01)
(52) U.S. Cl.
CPC ............. *G02F 1/167* (2013.01); *G02F 1/0102* (2013.01); *G02F 2001/1672* (2013.01)

(58) Field of Classification Search
CPC ...... G02F 1/167; G02F 1/0102; G02F 1/133; G02F 2001/1672
USPC ........ 359/296, 253–254, 245, 290–291, 298; 349/33; 345/49, 105, 107; 430/31–32; 438/18, 745
See application file for complete search history.

(56) References Cited

U.S. PATENT DOCUMENTS 6,327,072 B1 * 12/2001 Comiskey ............... G02F 1/167
204/450
2005/0153243 A1 * 7/2005 Rundle ................... B41C 1/003
430/300

(Continued)

FOREIGN PATENT DOCUMENTS

CN        101930147 A     12/2010

OTHER PUBLICATIONS

Second Chinese Office Action dated May 28, 2015; Appln. No. 201310064383.4.
First Chinese Office Action dated Dec. 3, 2014; Appln. No. 20130064383.4.

(Continued)

*Primary Examiner* — Scott J Sugarman
*Assistant Examiner* — Kristina Deherrera
(74) *Attorney, Agent, or Firm* — Ladas & Parry LLP (57) ABSTRACT

Embodiments of the present invention relates to an electrophoretic display (EPD) device and a method for manufacturing the EPD device. The EPD device includes an electrophoretic substrate and a drive substrate arranged opposite to each other and a plurality of microcups disposed between the electrophoretic substrate and the drive substrate, each microcup includes a cup body for defining an accommodating space; a thickness of the cup body on one side of the microcup closer to the electrophoretic substrate is less than a thickness of the cup body on one side of the microcup closer to the drive substrate; and a cup surface of the microcup is a cambered surface which is away from a vertical central axis of the microcup and concave towards the cup body.

8 Claims, 5 Drawing Sheets

(56) References Cited

U.S. PATENT DOCUMENTS

| | | | |
|---|---|---|---|
| 2007/0134825 A1 | 6/2007 | Zou et al. | |
| 2010/0265565 A1* | 10/2010 | Wang | G02F 1/167 359/296 |
| 2010/0328756 A1 | 12/2010 | Miyashita et al. | |
| 2013/0264728 A1* | 10/2013 | Myoung | G02F 1/167 264/1.24 |

OTHER PUBLICATIONS

International Search Report dated Dec. 5, 2013; PCT/CN2013/075085.

Written Opinion of the International Searching Authority dated Dec. 5, 2013; PCT/CN2013/075085.

International Preliminary Report on Patentability Appln. No. PCT/CN2013/075085; Dated Sep. 1, 2015.

* cited by examiner

ELECTROPHORETIC DISPLAY DEVICE AND METHOD FOR MANUFACTURING THE SAME

TECHNICAL FIELD

Embodiments of the present invention relate to an electrophoretic display (EPD) device and a method for manufacturing the same.

BACKGROUND

Electrophoretic display involves a new display technology, and it also involves a display technology capable of achieving alternate color display by the movement of charged particles via the control on presence and absence of the electric field between two plate electrodes arranged opposite to each other in accordance with the principle that the charged particles can move in the electric field.

In an EPD device, one electrophoretic unit works as a pixel; the electrophoretic units are arranged in a two-dimensional matrix to form a display plane; different gray-scales or colors can be displayed by lightening or darkening the pixels as required; and plane images can be obtained with the combination of pixels. Microcup EPD devices are one type of the EPD devices and can be applied to newspapers, magazines, books, print advertisements and the like, and electronic paper (e-paper) is one of the various applications.

A microcup EPD device is manufactured by forming electrophoresis liquid by dispersing charged pigment particles in a dielectric solvent, encapsulating the electrophoresis liquid in microcups, and finally arranging the microcups between two plate electrodes (namely an electrophoretic substrate and a drive substrate). When a voltage is applied to the two plate electrodes, the charged particles will migrate between the two plate electrodes in the form of electrophoresis according to the their charge properties and the electric field direction; the movement of the charged particles is controlled by the application of appropriate voltage to each region of the plate electrode; and hence corresponding images can be generated by the display device.

Compared with the passive technology, the active matrix drive technology can achieve better control and good information display and has superior advantages in the aspects of high resolution, color display and the like. Therefore, the current high-end electronic paper mostly adopts the active matrix drive technology. Thin-film transistor (TFT) technology is the most frequently applied active matrix technology. In an active matrix drive EPD technology, the TFTs are integrated on a substrate to form a drive substrate; electrophoresis gel is disposed on an electrophoretic substrate; the electrophoretic substrate and the drive substrate are bonded to form a display panel; electrical signals of a pixel electrode are controlled by the TFTs, so that charged particles in the electrophoresis gel can be migrated/gathered on a display surface, and hence external light can be reflected or absorbed, and consequently images can be formed.

Figure 1:
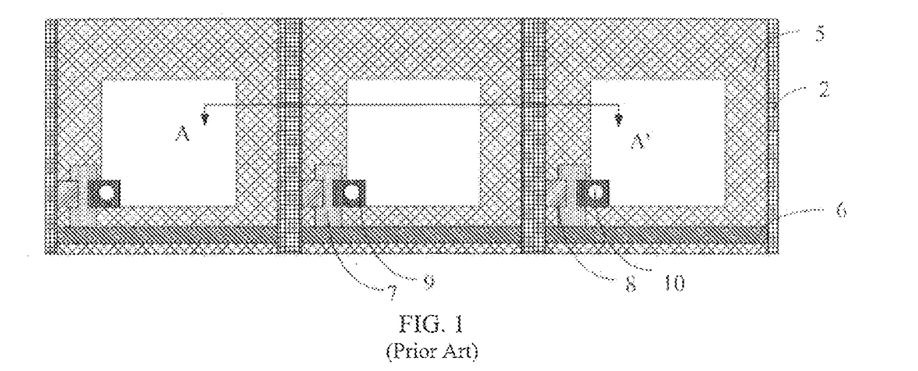
FIG. 1 is a schematic plan view of a drive substrate in a traditional microcup EPD device.
Figure 2:
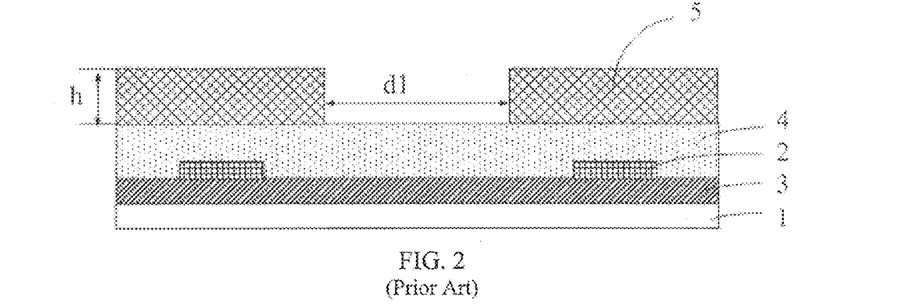
FIG. 2 is a longitudinal sectional view of the drive substrate of the traditional microcup EPD technology as shown in FIG. 1 along line A-A' direction.

FIGS. 1 and 2 are respectively a schematic plan view and a longitudinal sectional view of a drive substrate in a traditional microcup EPD device. Each sub-pixel of the drive substrate comprises a gate electrode layer 7, a Gate Insulating Layer, an active layer, an ohmic contact layer, a source electrode layer 8, a drain electrode layer 9, a channel protective layer, and a pixel electrode layer which are disposed on a substrate 1, and comprises a via hole 10 for connecting the drain electrode layer 9 and the pixel electrode layer; the gate electrode layer 7 is connected with a scanning line 6; the source electrode layer is connected with a data line 2; and the drain electrode layer 9 is connected with the pixel electrode layer. Moreover, partition walls 5 are also disposed in regions corresponding to the data lines and the scanning lines. Longitudinal sections of the partition walls 5 are of a rectangular shape, and the transverse width of an opening portion of a microcup is d1. Aperture ratio is an important parameter of the EPD device. The higher the aperture ratio, the higher the light transmission efficiency. Therefore, the higher the reflectivity of an EPD panel, the higher the contrast. However, the above microcup structure has the defect of low aperture ratio for the microcups.

In order to achieve a higher contrast, in Chinese Patent No. CN01144631.5, a microcup structure is designed to have a wide cup rim and a narrow cup body so as to attain a higher aperture ratio, and hence the resolution of the display panel can be improved along with the improvement of the aperture ratio. However, if the cup body is too narrow, the compressive strength of the display device can be reduced.

Figure 3:
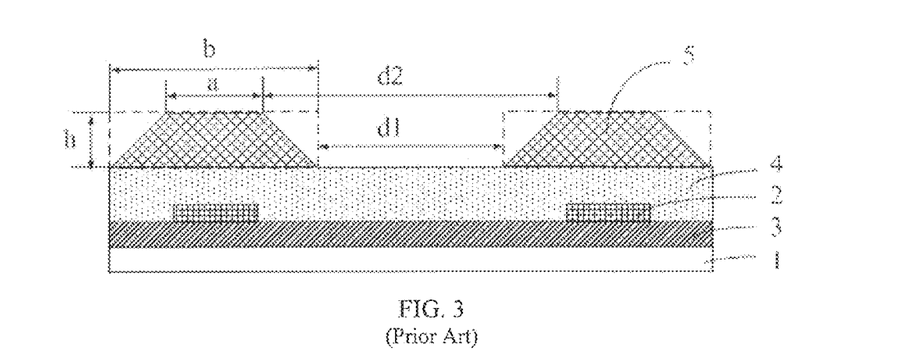
FIG. 3 is another schematic structural view of a traditional microcup.

Moreover, in order to improve the aperture ratio of microcups, Chinese Patent No. CN201886252U discloses a cup body of which the longitudinal section is of a trapezoidal shape. As illustrated in FIG. 3, in this case, the transverse width of an opening portion of the microcup is d2. Although the aperture ratio is improved to a certain degree, the compressive strength of the cup body is also reduced.

Therefore, how to not only increase the aperture ratio of the microcup in an EPD device but also not reduce the compressive strength of the microcup structure is a problem to be solved.

SUMMARY

Embodiments of the present invention provide an EPD device and a method for manufacturing the same. The microcup structure in the EPD device has a large aperture ratio and meanwhile has a good compressive strength.

In one aspect, the present invention provides an EPD, which comprises an electrophoretic substrate and a drive substrate arranged opposite to each other and a plurality of microcups disposed between the electrophoretic substrate and the drive substrate; each microcup includes a cup body for defining an accommodating space; a thickness of the cup body on one side of the microcup closer to the electrophoretic substrate is less than a thickness of the cup body on one side of the microcup closer to the drive substrate; and a cup surface of the microcup is a cambered surface which is away from a vertical central axis of the microcup and concave towards the cup body.

For instance, in the EPD device, the cup body is formed by a plurality of partition walls arranged in an array; upper surfaces and lower surfaces of the partition walls are parallel to each other; and both the two side-walls of the partition wall are cambered surfaces.

For instance, in the EPD device, a shape of the cambered surface may be one part of a spherical or ellipsoidal shape.

For instance, in the EPD device, a height of the partition wall may be ranged from 1 to 10 micrometers; and a radius of cambered surface of the two side-walls of the partition wall may be ranged from 4 to 10 micrometers.

For instance, in the EPD device, the partition walls are made of an opaque material; and the optical density of the opaque material may be ranged from 1 to 5.

For instance, the drive substrate includes a TFT of each sub-pixel and a data line and a scanning line which are intersected with each other; and the partition walls are disposed in regions corresponding to the data lines and the scanning lines.

In another aspect of the present invention, the present invention provides a method for manufacturing an EPD device, which comprises the step of forming a microcup array on a drive substrate; the microcup array is formed by a patterning process or pressing by a roll-to-roll method; each microcup includes a cup body for defining an accommodating space; a thickness of the cup body on one side of the microcup closer to the electrophoretic substrate is less than a thickness of the cup body on one side of the microcup closer to the drive substrate; and a cup surface of the microcup is a cambered surface which is away from a vertical central axis of the microcup and concave towards the cup body.

For instance, in the preparation method, the step of forming the microcup array by a patterning process further comprises the following steps:

step S1): forming a microcup film layer and a photoresist layer on the drive substrate;

step S2): performing exposure on the photoresist layer;

step S3): performing development on the exposed photoresist layer;

step S4): performing isotropic etching on the microcup film layer; and step S5): removing a photoresist to obtain the microcup array.

Moreover, for instance, before the step S5, the method further comprises: performing back exposure on the etched microcup film layer from one side of the drive substrate not provided with the microcups; and correspondingly, after the step of removing the photoresist in the step S5, the method further comprises: performing thermocuring on the microcup film layer subjected to back exposure.

For instance, concave roller gears of which a size and a shape are the same with those of the microcups are formed in a roll-to-roll device when the microcup array is formed by a roll-to-roll method.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

REFERENCE NUMERALS

1—Substrate; 2—Data Line; 3—Gate Insulating Layer; 4—Channel Protective Layer; 5—Partition Wall; 50—Microcup Film Layer; 6—Scanning Line; 7—Gate Electrode Layer; 8—Source Electrode Layer; 9—Drain Electrode Layer; 10—Via hole; 11—Photoresist; 12—Ultraviolet Light; 13—Curved Support surface; 14—Horizontal Support Surface; 15—Patterning Roller; 16—Supporting Roller; 20—Drive Substrate; 30—Electrophoretic Substrate; 25—Electrophoresis liquid

DETAILED DESCRIPTION

For more clear understanding of the objectives, technical proposals and advantages of the embodiments of the present invention, clear and complete description will be given below to the technical proposals of the embodiments of the present invention with reference to the accompanying drawings of the embodiments of the present invention. It will be obvious to those skilled in the art that the preferred embodiments are only partial embodiments of the present invention but not all the embodiments. All the other embodiments obtained by those skilled in the art without creative efforts on the basis of the embodiments of the present invention illustrated shall fall within the scope of protection of the present invention.

Unless otherwise specified, the technical terms or scientific terms used herein have normal meanings understood by those skilled in the art. The words "first", "second" and the like used in the description and the claims of the patent application of the present invention do not indicate the sequence, the number or the importance but are only used for distinguishing different components. Similarly, the words "a", "an", "the" and the like also do not indicate the number but only indicate at least one. The word "comprise", "include" or the like only indicates that an element or a component before the word contains elements or components listed after the word and equivalents thereof, not excluding other elements or components. The words "connection", "couple" and the like are not limited to physical or mechanical connection but may include electrical connection, either directly or indirectly. The words "on", "beneath", "left", "right" and the like only indicate the relative position relationship which is correspondingly changed when the absolute position of a described object is changed.

Embodiment 1

In the present embodiment, the EPD device comprises an electrophoretic substrate 30 and a drive substrate 20 which are arranged opposite to each other and a plurality of microcups (MC) disposed between the electrophoretic substrate 30 and the drive substrate 20. Each microcup includes a cup body for defining an accommodating space; the thickness of the cup body on one side of the microcup closer to the electrophoretic substrate 30 is less than the thickness of the cup body on one side of the microcup closer to the drive substrate 20; and a cup surface of the microcup is a cambered surface which is away from a vertical central axis of the microcup and concave towards the cup body.

Figure 4A:
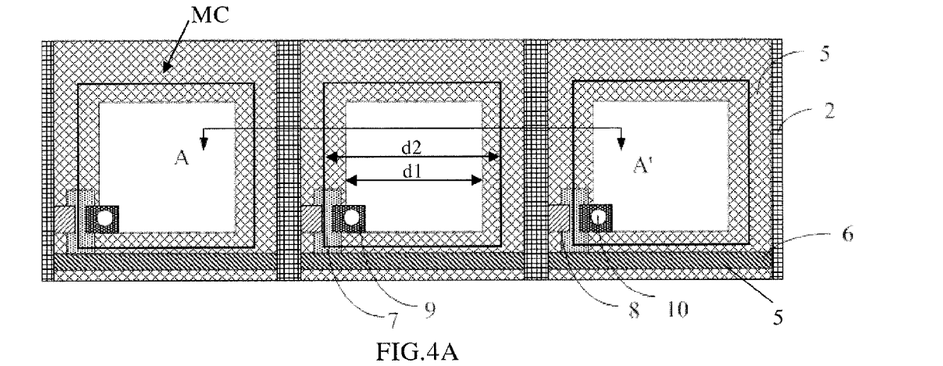
FIG. 4A is a schematic plan view of a microcup in a first embodiment of the present invention.
Figure 4B:
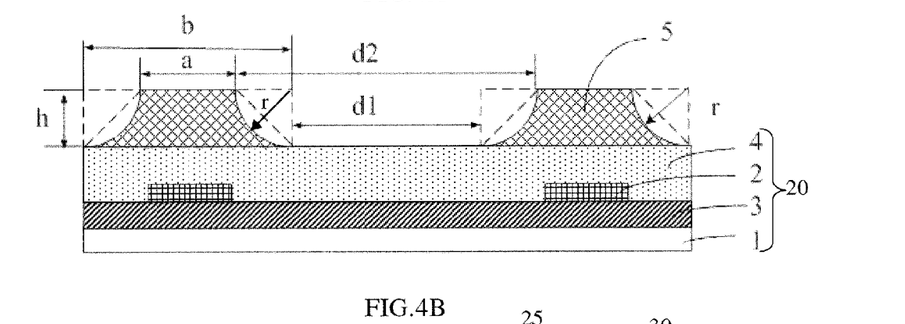
FIG. 4B is a longitudinal sectional view of a drive substrate of the microcup EPD technology as shown in FIG. 4A along line A-A' direction.

As illustrated in FIGS. 4A and 4B, the cup body is formed by a plurality of partition walls 5 arranged in an array, which are disposed on a surface of the drive substrate 20; and transversely extending partition walls 5 and longitudinally extending partition walls 5 are intersected with each other to define a plurality of microcups. Correspondingly, the plurality of microcups are also arranged in an array, and hence the structure of the plurality of microcups is also referred to as a microcup array. Each microcup corresponds to a sub-pixel of the EPD device. In the longitudinal sectional view of the cup body, the upper surfaces and the lower surfaces of the partition walls 5 are parallel to each other, and both the two side surfaces of the partition wall 5 are cambered surfaces. For instance, the shape of the cambered surfaces is one part of a spherical or ellipsoidal shape. The cambered surfaces are concave towards the cup body, namely concave outwards relative to an internal space of a microcup.

The thickness a of the cup body on one side of the microcup closer to the electrophoretic substrate 30 is less than the thickness b of the cup body on one side of the microcup closer to the drive substrate 20.

For instance, the height of the partition walls 5 may be ranged from 1 to 10 micrometers, and the radius r of the cambered surface of the two side surfaces may be ranged from 4 to 10 micrometers.

The partition walls 5 are made of an opaque material; and the optical density (OD) of the opaque materials is ranged from 1 to 5. For instance, the partition walls 5 are made of a polymer material or an oxide polymer material used for forming a black matrix (BM) in a color filter substrate in the technical field of display.

Optical density refers to a logarithm of the ratio of incident light to transmitted light or a logarithm of a reciprocal value of light transmittance. The computing formula is OD=log10 (incident light/transmitted light) or OD=log10 (1/light transmittance).

The drive substrate 20 includes a plurality of TFTs corresponding to a plurality of sub-pixels, as illustrated in FIG. 4A. The TFT of each sub-pixel includes a gate electrode layer 7, a gate insulating layer 3, an active layer, an ohmic contact layer, a source electrode layer 8, a drain electrode layer 9, a channel protective layer 4 and a pixel electrode layer which are formed on a substrate in sequence, and comprises a via hole 10 for connecting the drain electrode layer 9 and the pixel electrode layer 10; the gate electrode layer 7 is connected with a scanning line 6; the source electrode layer 8 is connected with a data line 2; and the drain electrode layer 9 is connected with the pixel electrode layer. Moreover, the gate insulating layer 3 and the channel protective layer 4 are made of opaque materials; the drive substrate 20 further includes the data lines and the scanning lines which are intersected with each other; and the partition walls 5 are disposed in corresponding regions corresponding to the data lines and the scanning lines.

Electrophoresis liquid 25 is filled in the accommodating space of each microcup, namely charged pigment particles are dispersed in a dielectric solvent to obtain the electrophoresis liquid 25.

The ABAQUS software is used for finite element analysis (FEA), comparing the compressive strength of the traditional microcup and the compressive strength of the microcup in the embodiment. The height, the thickness of an upper base (corresponding to the width of a cup rim of the microcup), the thickness of a lower base (corresponding to the width of a cup bottom of the microcup), and the length of the traditional microcup are respectively and correspondingly equal to the height, the thickness of an upper base, the thickness of a lower base and the length of the microcup in the embodiment; and the materials adopted by both the kinds of microcups are the same.

As illustrated in FIG. 3, when the longitudinal section of the traditional cup body is of a trapezoidal shape, the thickness "a" of the upper base of the longitudinal section is equal to 8 micrometers; the thickness "b" of the lower base is equal to 18 micrometers; the height "h" is equal to 8 micrometers; and the length "l" is equal to 18 micrometers. However, in the embodiment, as illustrated in FIG. 4, the longitudinal section of the cup body is in the trapezoid-like shape of which two legs are each in the shape of a concave arc, the thickness "a" of the upper base is equal to 8 micrometers; the thickness "b" of the lower base is equal to 18 micrometers; the height "h" is equal to 8 micrometers; the length "l" is equal to 18 micrometers; and the radius "r" of the concave arcs of the two legs is equal to 7 micrometers (herein, spherical cambered surfaces). In the case of FEA, a same pressure is applied to upper surfaces of the above two cup bodies. Under the condition of the same pressure, the pressure stress produced in the cup bodies is compared. The result is that the compressive strength of the cup body in the embodiment is 1.43 times higher than that of the cup body in the traditional technology. Therefore, by adoption of the trapezoid-like cup body of which the longitudinal section is of a cambered shape, the compressive strength of the cup body can be effectively improved, and hence the cup body can bear a relatively higher pressure and cannot be easily damaged.

It should be understood that: FIG. 4 is a schematic diagram illustrating the example in which the cambered surface of the microcup is a spherical cambered surface, and the radius of the spherical cambered surface is "r"; and when the cambered surface of the microcup is an ellipsoidal cambered surface, due to major diameter and minor diameter with unequal lengths, the cup body formed by the partition walls in the shape of the cambered surface will correspondingly have different compressive strengths.

Figure 5A:
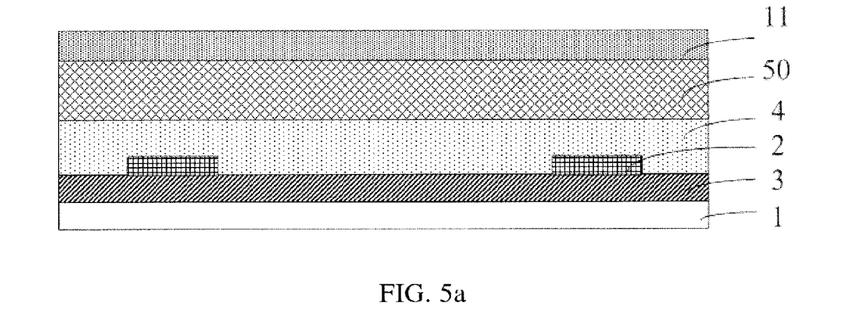
FIG. 5 is a process flow diagram illustrating the process of forming a microcup by a patterning process.
Figure 5B:
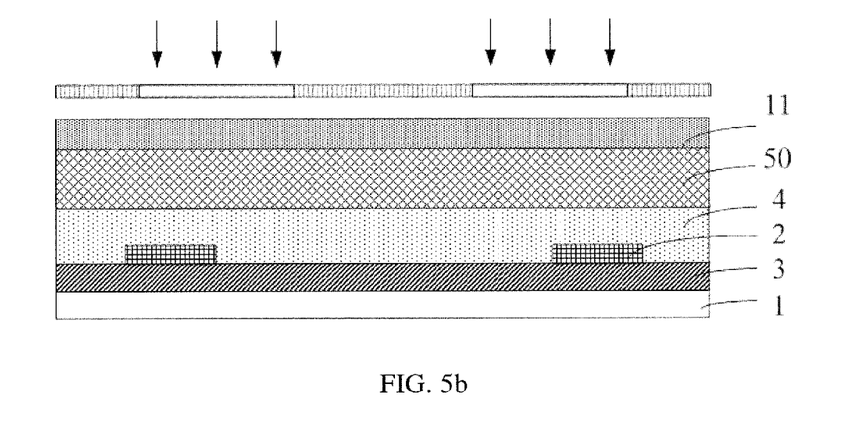
Figure 5C:
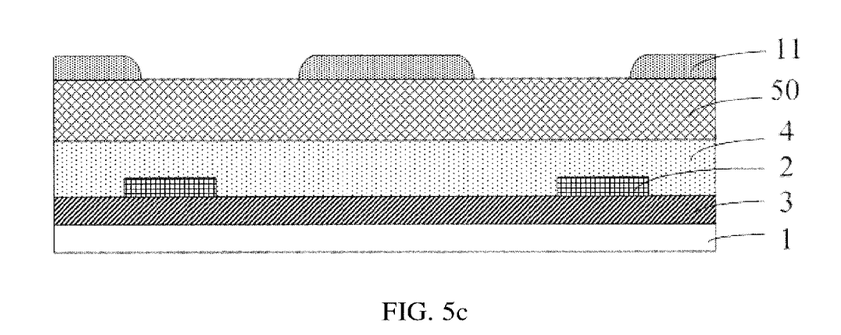
Figure 5D:
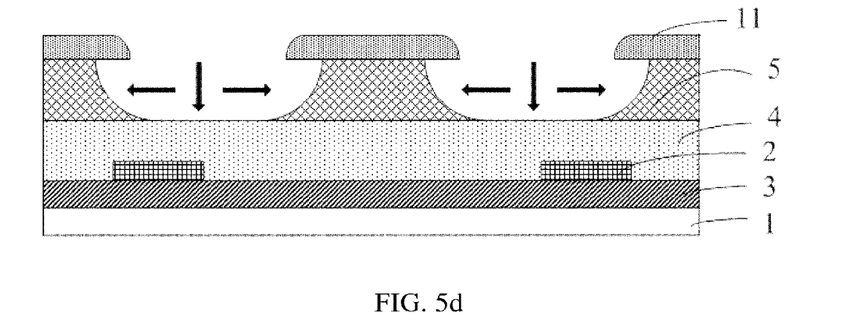
Figure 5E:
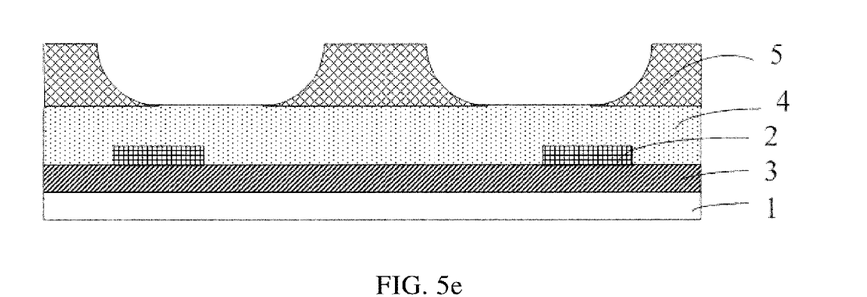

An embodiment further provides a method for manufacturing the EPD device, which comprises the step of forming a microcup array on the drive substrate. The microcup array may be formed by a patterning process. For instance, the method for forming the microcup array further comprises the following steps:

step S1): forming a microcup film layer 50 and a photoresist layer 11 on the drive substrate 20 in sequence, as illustrated in FIG. 5a;

step S2): performing exposure on the photoresist layer 11, as illustrated in FIG. 5b;

step S3): performing development on the exposed photoresist layer 11, as illustrated in FIG. 5c;

step S4): performing isotropic etching on the microcup film layer 50, as illustrated in FIG. 5d; and step S5): removing the photoresist to obtain the microcup array, as illustrated in FIG. 5e.

The method for forming the microcup array as shown in FIG. 3 by a patterning process is as follows: coating a microcup film layer → performing exposure on the microcup film layer → performing development on the microcup film layer and then performing thermocuring on the microcup film layer.

However, in the embodiment, the method for forming the microcup array by a patterning process is as follows: coating a microcup film layer and a photoresist layer → performing exposure on the photoresist layer → performing development on the photoresist layer → performing dry etching on the microcup film layer → removing the photoresist. The microcup film layer is made of a non-metallic inorganic material, and the microcup film layer is not required to be subjected to thermocuring after the photoresist layer is removed.

By comparison, it can be clearly seen that: the etching process in the embodiment is dry etching and the isotropy is maintained in the etching process (as shown in FIG. 5d). That is to say, the etching rates of etching gas on the microcup film layer in various directions are the same so that the longitudinal section of the etched microcup structure is in the trapezoid-like shape of which two legs are cambered to a certain degree.

Figure 5E:
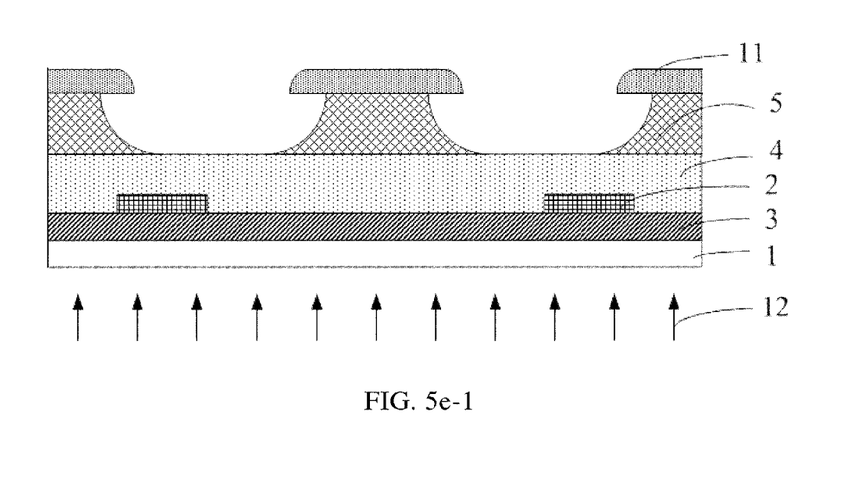

The material of the microcup film layer is not limited to a non-metallic inorganic material. Where a polymer material, for instance, the polymer material for forming a black matrix, is adopted, before the step S5, the method further comprises: performing back exposure on the etched microcup film layer 50 from one side of the drive substrate not provided with the microcups, as illustrated in FIG. 5e-1.

Figure 5E:
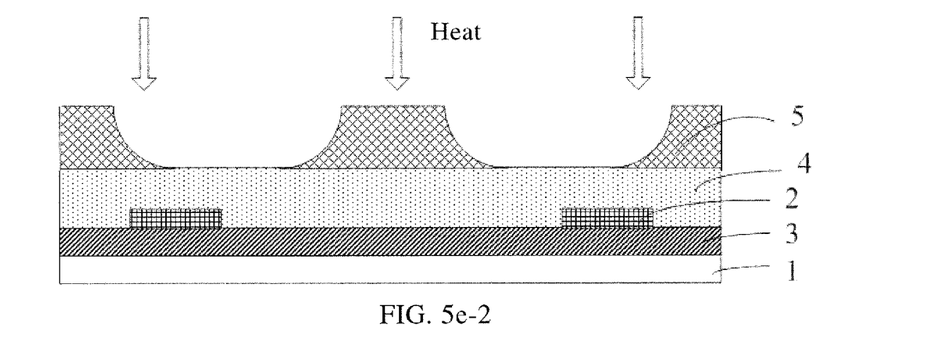

Correspondingly, after the photoresist is removed in the step S5, the method further comprises: performing thermocuring on the microcup film layer subjected to back exposure, as illustrated in FIG. 5e-2.

That is to say, where the polymer material for forming a black matrix is adopted to form the microcup array, the method for forming the microcup array by a patterning process is correspondingly as follows: coating the microcup film layer and the photoresist layer → performing exposure on the photoresist layer → performing development on the photoresist → performing dry etching or wet etching on the microcup film layer → performing back exposure on the microcup film layer → removing the photoresist and performing thermocuring on the microcup film layer. Here, the etching process in the embodiment not only can adopt dry etching but also can adopt wet etching. Meanwhile, the process of back exposure is performed after the etching process, so that the trapezoid-like shape of the microcup in the microcup array can be guaranteed to be not smoothed in the thermocuring process, and hence the trapezoid-like shape of the microcup in the microcup array can be further strengthened or maintained.

Figure 4C:
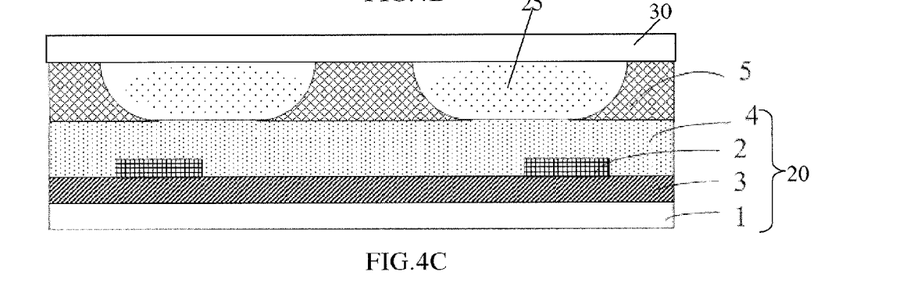
FIG. 4C is a longitudinal sectional view of an EPD device in the first embodiment of the present invention.

As illustrated in FIG. 4C, the drive substrate 20 provided with the microcup array that has been manufactured on the EPD device in the embodiment, after the microcups are filled with electrophoresis liquid 25, is bonded together with the electrophoretic substrate 30 through an adhesive for instance, thereby an EPD panel can be formed.

Embodiment 2

The difference of the present embodiment with the first embodiment is that the forming methods of the microcup array are not the same.

In the embodiment, the microcup array adopts a thermosetting precursor layer as a microcup film layer and is pressed by a roll-to-roll method. When the microcup array is formed by a roll-to-roll method, convex roller gears of which the size and the shape are the same as those of the microcups are formed in a roll-to-roll device.

Figure 6:
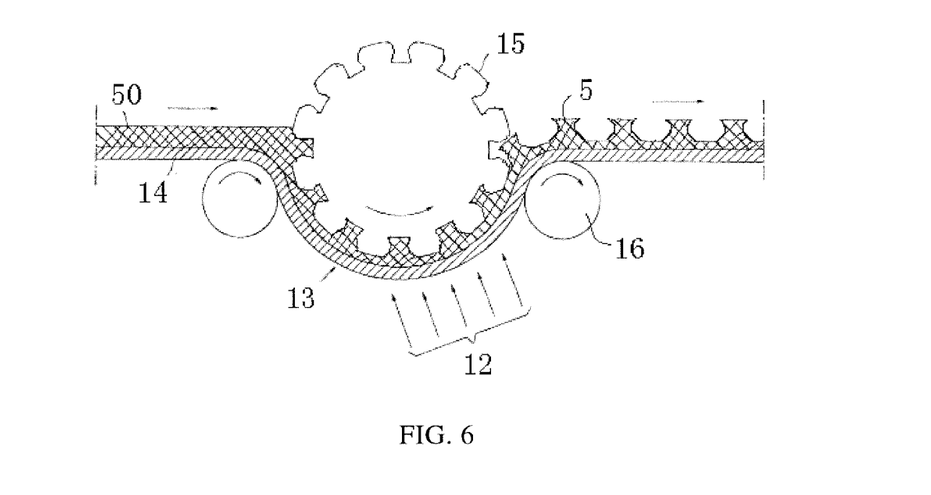
FIG. 6 is a schematic diagram illustrating the process of forming a microcup array by a roll-to-roll method in a second embodiment of the present invention.

As illustrated in FIG. 6, the roll-to-roll device comprises: two supporting rollers 16 arranged opposite to each other, a support surface formed on the two supporting rollers, and a patterning roller 15 disposed on the support surface. Axes of the two supporting rollers 16 are in the same straight line; the patterning roller 15 is disposed between the two supporting rollers 16; the support surface is flexible to a degree and capable of being curved; when the patterning roller 15 is pressed down, a curved support surface 13 is formed by the support surface corresponding to the pressed portion of the patterning roller; and the support surface in the rest portion is still maintained to be a horizontal support surface 14.

When the microcup array is formed, the microcup film layer 50 of which the thickness is greater than the height "h" of the microcups is disposed on the support surface of the roll-to-roll device at first; the microcup film layer 50 is moved on the support surface of the roll-to-roll device along with the rotation of the supporting rollers 16, and is feed into the curved support surface 13 from the horizontal support surface 14 and at the same time is pressed down by the patterning roller. The microcup film layer 50 is impressed by the patterning roller 15 to form a plurality of partition walls 5 arranged in an array; and hence the microcup array can be formed.

The structure of the microcup array in the present embodiment is the same with the structure of the microcup array in the first embodiment. No further description will be given herein.

After the microcup array in the embodiment is manufactured, the microcup array is bonded together with the drive substrate with adhesive; the microcups are filled with the electrophoresis liquid and hence bonded together with the electrophoretic substrate with adhesive; and hence the EPD panel can be formed.

Obviously, in the present invention, cup surfaces of the microcups in the EPD device are arranged to be cambered surfaces which are concave towards the cup body, away from vertical central axes of the microcups, and hence the display panel not only guarantees a large aperture ratio but also guarantees the compressive strength of the microcup structure and improves the display quality of the EPD device.

The foregoing is only the preferred embodiments of the present invention and not intended to limit the scope of protection of the present invention. The scope of protection of the present invention should be defined by the appended claims.

The invention claimed is:

1. An electrophoretic display (EPD) device, comprising an electrophoretic substrate and a drive substrate arranged opposite to each other and a plurality of microcups disposed between the electrophoretic substrate and the drive substrate,
    wherein each microcup includes a cup body for defining an accommodating space; a thickness of the cup body on one side of the microcup closer to the electrophoretic substrate is less than a thickness of the cup body on one side of the microcup closer to the drive substrate; and a cup surface of the microcup is a cambered surface which is away from a vertical central axis of the microcup and concave towards the cup body, wherein
    the cup body is formed by a plurality of partition walls arranged in an array; upper surfaces and lower surfaces of the partition walls are parallel to each other; and both the two side-walls of the partition wall are cambered surfaces, and
    a height of the partition walls is ranged from 1 to 10 micrometers; and a radius of the cambered surface of the two side-walls of the partition walls is ranged from 4 to 10 micrometers.

2. The EPD device according to claim 1, herein a shape of the cambered surface is one part of a spherical or ellipsoidal shape.

3. The EPD device according to claim 1, wherein the partition walls are made of an opaque material; and an optical density of the opaque material is ranged from 1 to 5.

4. The EPD device according to claim 1, wherein the drive substrate includes a thin-film transistor (TFT) of each sub-pixel and a data line and a scanning line which are intersected with each other; and the partition walls are disposed in regions corresponding to the data line and the scanning line.

5. A method for manufacturing an EPD, comprising the step of forming a microcup array on a drive substrate, wherein the microcup array is formed by a patterning process or pressing in by roll-to-roll method; each microcup includes a cup body for defining an accommodating space; a thickness of the cup body on one side of the microcup closer to the electrophoretic substrate is less than a thickness of the cup body on one side of the microcup closer to the drive substrate; and a cup surface of the microcup is a cambered surface which is away from a vertical central axis of the microcup and concave towards the cup body, the cup body is formed by a plurality of partition walls arranged in an array; upper surfaces and lower surfaces of the partition walls are parallel to each other; and both the two side-walls of the partition wall are cambered surfaces, and a height of the partition was is ranged from 1 to 10 micrometers; and a radius of cambered surface of the two side-walls of the partition walls is ranged from 4 to 10 micrometers.

6. The method according to claim 5, wherein the step of forming the microcup array by a patterning process further comprises the following steps;

step S1): forming a microcup film layer and a photoresist layer on the drive substrate;

step S2): performing exposure on the photoresist layer;

step S3); performing development on the exposed photoresist layer;

step S4): performing isotropic etching on the microcup film layer; and step S5): removing the photoresist to obtain the microcup array.

7. The method according to claim 6, wherein before the step S5, the method further comprises: performing back exposure on the etched microcup film layer from one side of the drive substrate not provided with the microcups; and correspondingly, after the step of removing the photoresist in the step S5, the method further comprises: performing thermocuring on the microcup film layer subjected to back exposure.

8. The method according to claim 5, wherein convex roller gears of which a size and a shape are the same with those of the microcups are formed in a roll-to-roll device when the microcup array is formed in by roll-to-roll method.

* * * * *